(12) United States Patent
Henderson

(10) Patent No.: US 10,221,522 B1
(45) Date of Patent: Mar. 5, 2019

(54) WIRE ROPE TERMINATION AND TENSIONING FOR CABLE RAILING

(71) Applicant: Edwin Lee Henderson, Greeley, CO (US)

(72) Inventor: Edwin Lee Henderson, Greeley, CO (US)

( * ) Notice: Subject to any disclaimer, the term of this patent is extended or adjusted under 35 U.S.C. 154(b) by 11 days.

(21) Appl. No.: 15/607,453

(22) Filed: May 27, 2017

(51) Int. Cl.
*D07B 1/06* (2006.01)
*F16M 13/02* (2006.01)

(52) U.S. Cl.
CPC .............. *D07B 1/06* (2013.01); *F16M 13/022* (2013.01)

(58) Field of Classification Search
CPC .................................. F16M 13/022; D07B 1/06
See application file for complete search history.

(56) References Cited

U.S. PATENT DOCUMENTS

| | | | | |
|---|---|---|---|---|
| 2,699,589 A * | 1/1955 | Redell | ...................... | B66C 1/48 254/29 A |
| 3,278,210 A * | 10/1966 | Sanders | .................... | F16B 7/06 254/232 |
| 4,627,762 A | 12/1986 | Scotti | | |
| 5,015,023 A * | 5/1991 | Hall | ...................... | F16G 11/048 24/115 G |
| 5,197,166 A * | 3/1993 | Meier | .................. | F16G 11/101 24/115 G |
| 5,594,977 A * | 1/1997 | McCallion | .......... | E04G 17/0707 24/115 M |
| 6,733,203 B2 * | 5/2004 | Carlsen | ................. | F16G 11/048 403/365 |
| 7,043,801 B2 | 5/2006 | Toimil | | |
| 7,198,253 B2 | 4/2007 | Striebel | | |
| 8,966,737 B2 | 3/2015 | Rohland | | |
| 9,249,577 B2 | 2/2016 | Ross | | |
| 2011/0084180 A1 * | 4/2011 | Toimil | .................. | F16G 11/106 248/74.2 |
| 2013/0087753 A1 * | 4/2013 | Landry | ................... | E04H 17/10 256/47 |

OTHER PUBLICATIONS

Atlantis, Aug. 2015, Nautilus Cable Railing Installation Instructions, p. 4 (example of large termination hardware).
ULTRA-TEC, Mar. 2017, Cable Railing Application Guide, p. 5 (several types of cable termination).
ULTRA_TEC, Jan. 2017, Cable Railing Installation, p. 4 (example of a ferrule as a cable stop).

* cited by examiner

*Primary Examiner* — Robert Sandy
*Assistant Examiner* — David M Upchurch

(57) ABSTRACT

A cable gripping and tensioning apparatus is provided for attaching a cable to an anchor point such as a wooden post as part of a cable railing system. In one form, the apparatus includes a tubular component and a ferrule. The tubular component includes external threads to engage the wall of a hole in the post, an internal axial bore through which a cable may pass, a first end which may engage a wrench to rotate the tubular component and a second end which may provide a thrust bearing surface. The ferrule is swaged to an end portion of the cable. The ferrule provides a thrust bearing surface for contact with the second end of the tubular component, allowing for the rotation of the tubular component to tension the cable while the cable does not rotate.

3 Claims, 4 Drawing Sheets

WIRE ROPE TERMINATION AND TENSIONING FOR CABLE RAILING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR COMPUTER PROGRAM LISTING

Not Applicable

BACKGROUND

A style of hand railing, used both indoors and outdoors, residential and commercial, uses wire rope as the balusters. This style is commonly referred to as "Cable Railing". This type of railing may also be referred to as "cable infill" as opposed to "baluster infill". The wire rope may create vertical or horizontal balusters. The horizontal design being far more common. The primary advantage of cable railing is a less obstructed view. Since the diameter of the cable is relatively small, it provides for an open view through the railing. The less obstructed view is particularly desirable if the surrounding area is a scenic view. There is another significant advantage of the cable railing system. The cable and cable termination fittings are generally made of stainless steel and are relatively maintenance free. This avoids the task of periodically painting conventional balusters. With a cable railing system, only the posts would need to be painted. The cable railing in a given location may also be considered more attractive than balusters. There are many combinations of railing styles, post styles, and cable fitting styles used to produce a given cable railing system.

A disadvantage of existing cable railing systems is cost. In general, cable railing systems cost significantly more than the conventional baluster systems. For many applications cable railing would be the more desirable system. However, the high cost discourages its use. The major cause of the relatively high cost is the cost of the cable termination fittings. Each cable has two ends that must have a cable termination fitting. Each section of a railing requires approximately nine to twelve cables. These fittings are required to attach and/or tighten the cable to an anchor point. The anchor point is usually a stationary post but may also be any suitable structure such as a wall of a building.

There are many different types of termination fittings. Two major groups of fittings are defined by the way in which they grip the cable. These two types could be referred to as swage fittings and swageless fittings. For swage fittings, the cable is inserted into the center of a tubular section of the fitting. A tool compresses or swages the tubular section to the cable. Swageless fittings have an outer tubular piece with a tapered wall in the internal bore. A plurality of wedges, that fit between the internal bore and the cable, clamp onto the cable. The grip of the wedge prevents the cable from slipping out of the swageless fitting.

The swage fittings are smaller, simpler, and less expensive. Swaging tools are required. If a mistake is made, the fitting cannot be reused once it has been swaged. Swageless fittings are larger, more complex and more expensive. Swageless fittings require no tools if they are of the spring type and only require common wrenches if they are of the threaded compression type. Swageless fittings may be disconnected from the cable and reused if a mistake is made. Examples of the swageless fitting type are Scotti U.S. Pat. No. 4,627,762 (1986) and Toimil U.S. Pat. No. 7,043,801 (2006)

Every cable run must have a tensioning fitting on at least one end of the cable. In general tensioning devices are large and consist of many components. The swageless design makes them even larger and increases the number of components. This makes them expensive and unsightly. Existing cable termination fittings have a varying degree of exposure outside of the posts. With few exceptions every existing type of cable termination has an undesirable visual exposure on one or both sides of the post. Often this exposure is very large. An example of a typical large fitting with many parts is Striebel & Striebel U.S. Pat. No. 7,198,253 (2007), see FIG. 5. A main feature of the cable railing system is to reduce the obstruction of the view by the railing hardware to a minimum. Large exposed cable termination hardware diminishes this objective.

SUMMARY

In one embodiment, a cable termination fitting comprises a tubular component and a ferrule. The tubular component comprises external threads, an internal axial bore through which a cable may pass, a first end which may engage a wrench to rotate the tubular component in a hole inside a solid material such as wood, and a second end which may serve as a thrust bearing surface. The external threads may engage mating threads in a hole in a solid material such as a wooden post. The ferrule or cable stop or sleeve is swaged to the cable end, attaching it firmly to the cable. An example of the use of a ferrule is in Rohland U.S. Pat. No. 8,966,737 (2015). One end of the ferrule provides a thrust bearing surface for contact with the second end of the tubular component, allowing for the rotation of the tubular component to tension the cable while the cable does not rotate. The cable may thereby be attached to a suitable anchor point such as a stationary wooden post. It may also tension the cable.

A purpose of a cable termination fitting is to securely attach the cable to an anchor point. Another purpose of a cable termination fitting may be to tension the cable. It would be desirable if the fitting is not seen at all. It would be desirable that the fitting be small and simple, thereby making it low cost. It would further be desirable that the fitting be easy to install.

Other advantages and features of an embodiment will become apparent in the following detailed description and drawings. The drawings are designed solely for the purpose of illustration and not as a definition of the limits of the invention, for which reference should be made to the appended claims.

DETAILED DESCRIPTION OF SPECIFIC EMBODIMENTS

In order to more fully describe embodiments of the disclosure, reference is made to the accompanying drawings. These drawings are not to be considered limitations in the scope of the invention, but merely illustrative.

Figure 1:
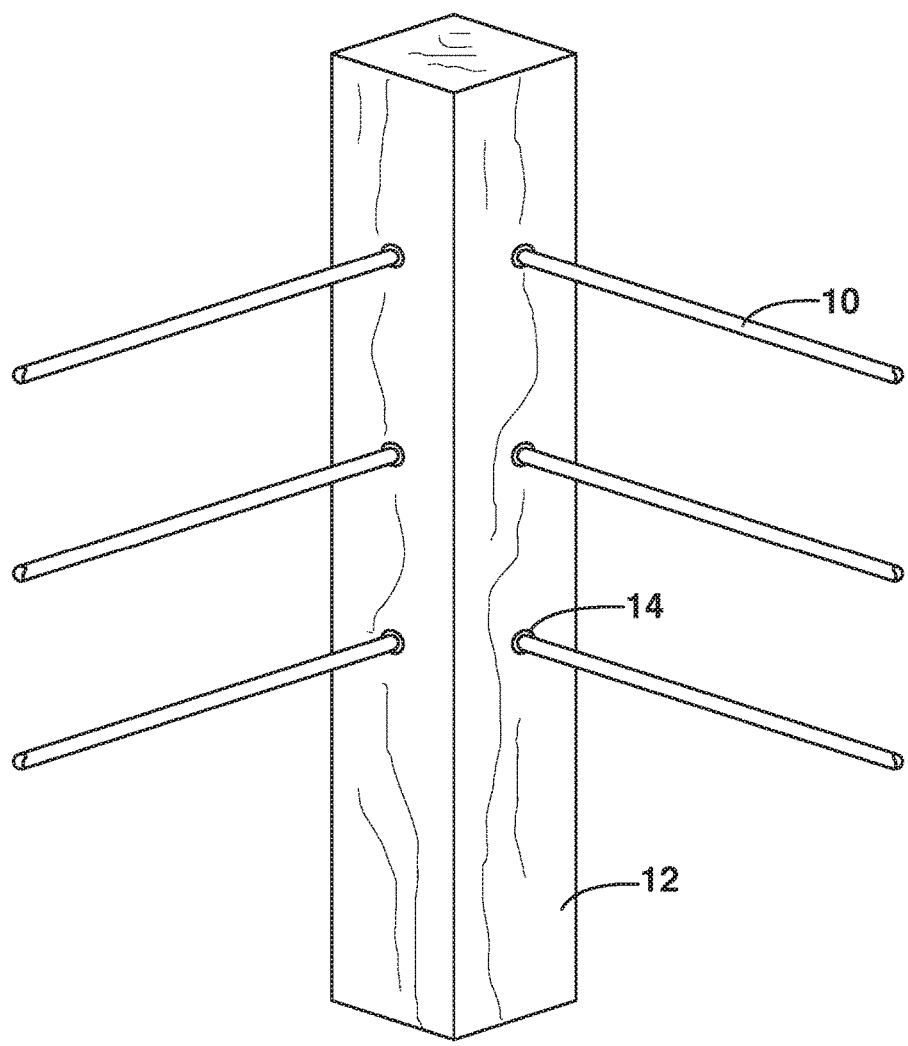
FIG. 1 is a perspective view illustrating multiple cable termination and tensioning apparatus installed in a wooden railing post, according to certain embodiments of the present disclosure.

FIG. 1 shows a plurality of wire ropes or cables 10 terminating to a wooden post 12. In one embodiment a termination and tensioning apparatus attaches the cables 10 to the post 12. Termination fittings are not visible as the fittings are located in a threaded hole 14 inside the post. The termination and tensioning fitting could be installed in any solid material such as wood, composite or metal. The termination apparatus is ideal in that it securely anchors the cable 10 to the post 12 but is not seen by the end user.

Figure 2:
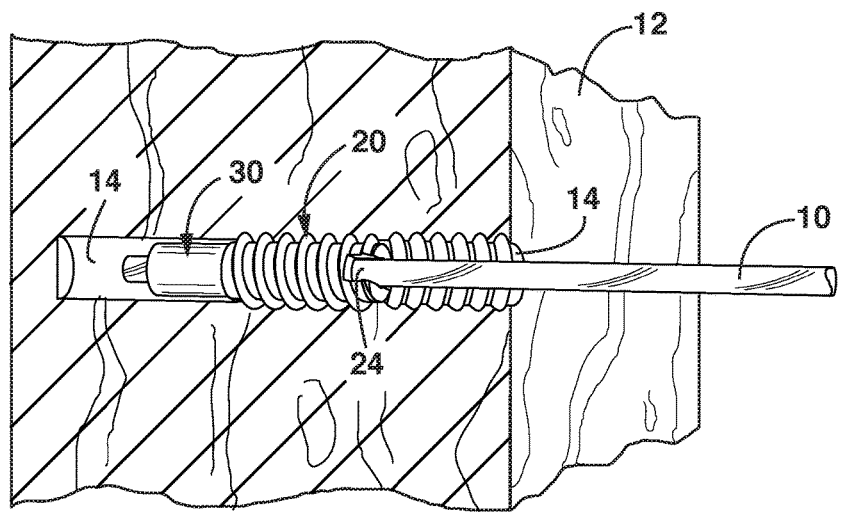
FIG. 2 is a cross-sectional view of the apparatus illustrating how it is installed in FIG. 1, according to certain embodiments of the present disclosure.

FIG. 2 is a cross-sectional view of the cable 10 and termination apparatus comprising a tubular component 20 and a ferrule 30 as it is installed in the post 12 of FIG. 1. In one embodiment, a hole 14 is drilled and tapped into the post 12. The termination apparatus is installed on the cable 10. The tubular component 20 is screwed into the hole 14, thereby urging the ferrule 30 and consequently the cable 10 into the post. The termination and tensioning apparatus firmly anchors the cable 10 inside the post 12. By screwing the tubular component 20 into the hole 14 to a certain depth, the cable may be tensioned.

Figure 3:
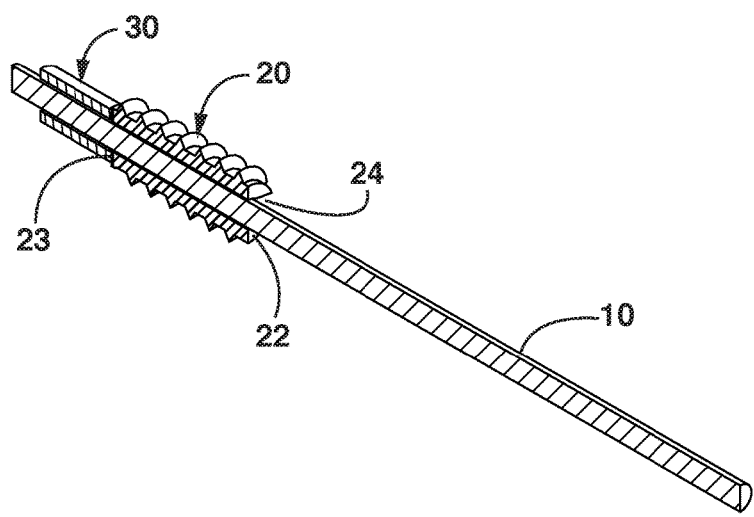
FIG. 3 is a perspective cross-sectional view illustrating the apparatus with a cable attached, according to certain embodiments of the present disclosure.

FIG. 3 is a perspective view of the termination apparatus. In one embodiment, the cable 10 is inserted through an axial opening or central passage or bore 28 of the tubular component 20. The cable enters a first end 22 of the tubular component 20 and exits a second end 23. The ferrule 30 is then placed over the end of the cable 10. The ferrule 30 is then swaged tightly to the cable 10. A first end 32 of the ferrule supplies a thrust bearing surface for the second end 23 of the tubular component 20 to bear against.

Figure 4:
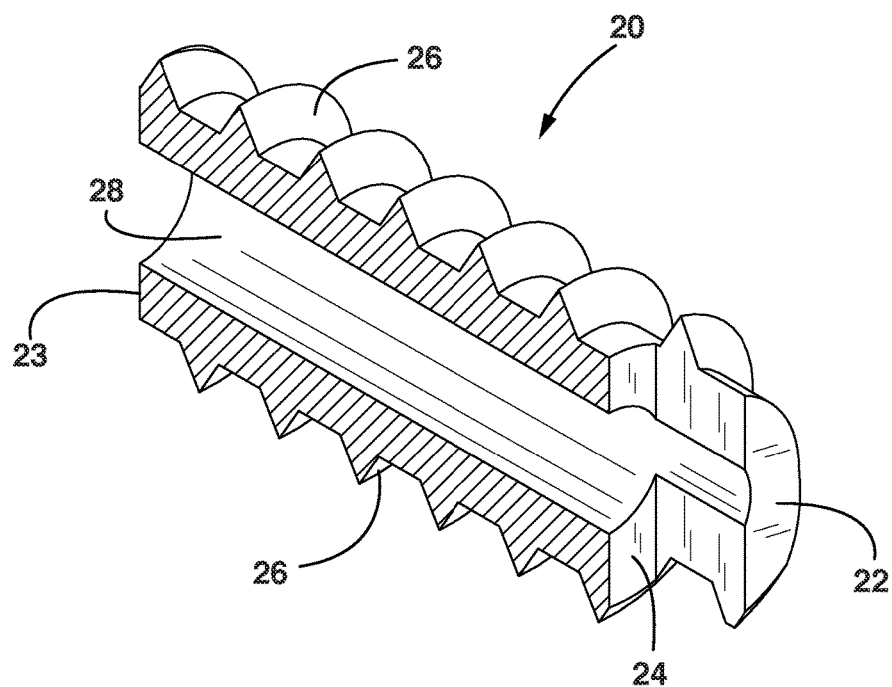
FIG. 4 is a perspective cross-sectional view illustrating the tubular component, according to certain embodiments of the present disclosure.

FIG. 4 is a cross-sectional view of the tubular component 20. In one embodiment, there is a threaded external surface 26 on the tubular component 20. These threads 26 engage mating threads in the hole 14. Many types of threads 26 might be used, depending on preference and the type of material the post 12 or other anchor point is made of. In one embodiment, the first end 22 contains a slot 24 for engaging a suitable wrench 40 that may move the tubular component 20 rotatably in the hole 14. Many different surface shapes on the first end 22 could be used to engage a mating type of wrench 40 to provide a rotating force to the tubular component 20. The second end 23 provides a thrust bearing surface to one end of the ferrule 30. Therefore, thrust can be applied to the ferrule 30. The tubular component 20 may rotate while simultaneously the ferrule 30 and the cable 10 do not rotate. The axial bore 28 located in the tubular component 20 provides an opening through which the cable 10 may pass.

Figure 5:
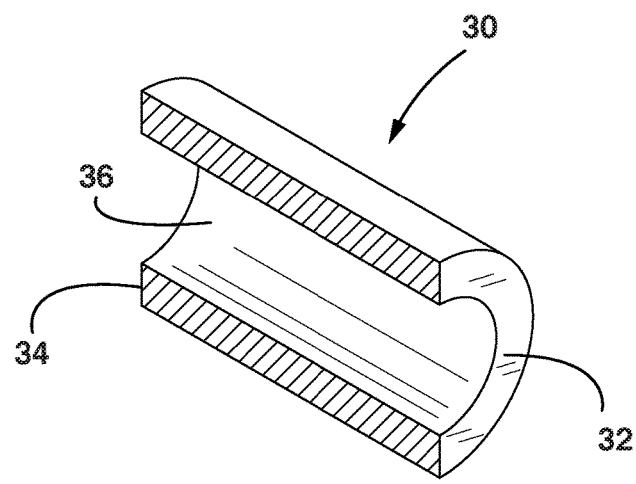
FIG. 5 is a perspective cross-sectional view illustrating the ferrule, according to certain embodiments of the present disclosure.

FIG. 5 shows the ferrule 30. In one embodiment, the ferrule 30 is a tubular shape having a first end 32 and second end 34. An axial bore 36 through the ferrule provides an opening through which the cable 10 may pass. After the ferrule 30 is placed onto the cable 10, it may be swaged to the cable. The swaging of the ferrule 30 to the cable 10 results in the ferrule 30 being firmly attached and fixed to the cable 10. The ferrule 30 then becomes stationary with respect to the cable 10.

Figure 6:
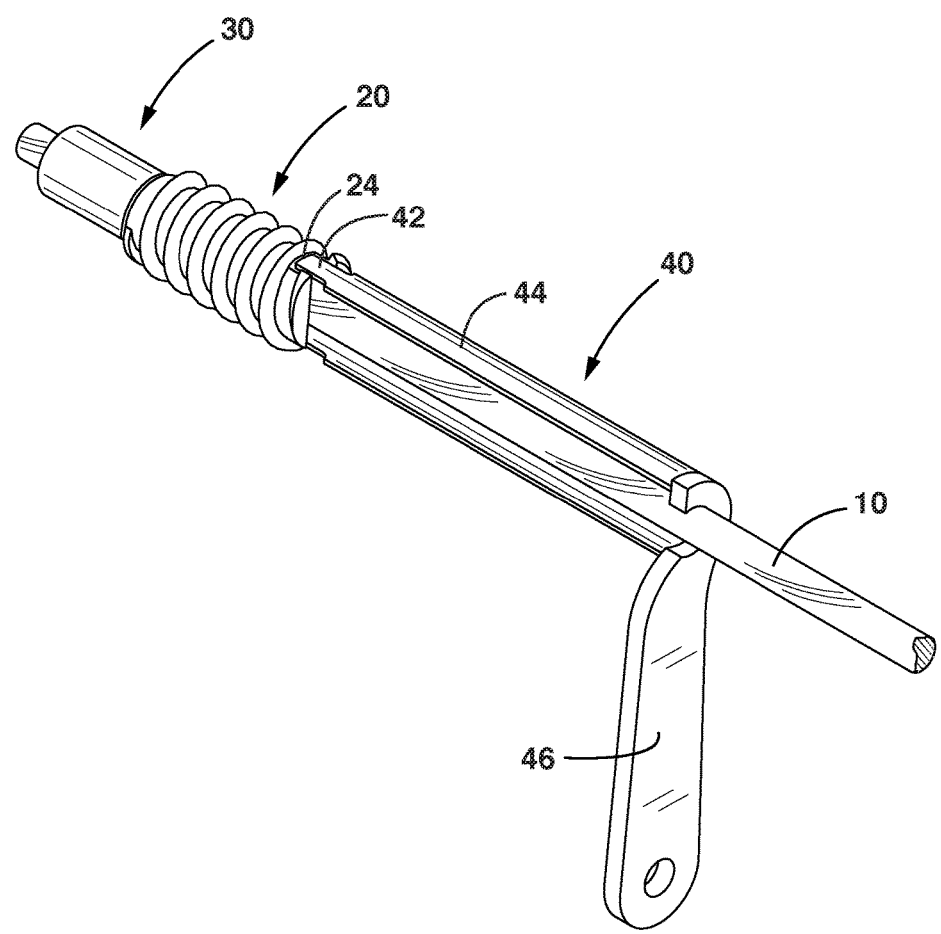
FIG. 6 is view illustrating a wrench, according to certain embodiments of the present disclosure.

FIG. 6 shows a wrench 40 that may be used to rotate the tubular component 20. In one embodiment, a wrench handle 46 is attached to one end of a shaft 44. The opposite end of the shaft has a flat area with tabs 42. The tabs 42 engage the slot 24 in the first end 22 of the tubular component 20, thereby providing a means to rotate the tubular component 20. The passage of the cable 10 through the wrench is accommodated by an axial slot in the shaft 44.

In another embodiment, the tubular component 20 has a flat or plurality of flats on the periphery of the first end 22. The wrench 40 has a mating shape.

In yet another embodiment, the tubular component 20 has an internal opening on the first end 22 of the tubular component with a flat or a plurality of flats. The wrench 40 has a mating shape.

I claim:

1. An apparatus for performing at least one of anchoring and tensioning a wire rope to a stationary structure comprising:

a tubular component comprising an axial opening through which the wire rope passes, a threaded external surface configured to grip a wall of a hole in the stationary structure, a first end having a surface for engaging a wrench to rotatably urge the tubular component, and a second end having a thrust bearing surface, wherein the tubular component is rotatable within the hole so that the external threads of the tubular component engage with mating threads in the hole in the stationary structure to move the tubular component in an axial direction to the hole in the stationary structure while, the wire rope remains rotatably stationary as the tubular component is rotated; and a ferrule located at the second end of the tubular component and near an end portion of the wire rope, the ferrule configured to be swaged to the wire rope, and comprising a first end having a thrust bearing surface, wherein the movement of the tubular component in the axial direction urges the second end of the tubular component against the first end of the ferrule, thereby performing at least one of firmly anchoring the wire rope to the stationary structure and tensioning the wire rope.

2. The apparatus of claim 1 wherein the first end of the tubular component comprises a slot that engages at least one of a mating shape and tabs on the wrench.

3. A cable termination system for connecting a wire rope to a stationary structure and for tensioning the wire rope comprising:

a tubular component having an axial central passage for receiving the wire rope, the tubular component comprising an outer circumference along an axial length, the outer circumference having threads for engaging mating threads in a hole located inside the stationary structure, and a first end having a surface configured for engaging a mating surface of a wrench so that the wrench can urge the tubular component in a rotatable motion to move the tubular component axially inside the hole so that the external threads of the tubular component engage with the mating threads in the hole; and a ferrule located at a second end of the tubular component and near an end portion of the wire rope, the ferrule being swaged to the wire rope, thereby urging the second end of the tubular component against one end of the ferrule to connect the wire rope to the stationary structure and to tension the wire rope.

* * * * *